United States Patent [19]

Newman et al.

[11] Patent Number: 4,770,958

[45] Date of Patent: Sep. 13, 1988

[54] STORAGE BATTERY HAVING A PROTECTIVE SHIELD

[76] Inventors: Malcolm Newman, 12 Beal Ct., Huntington, N.Y. 11743; Carl L. Abraham, 3 Baker Hill Rd., Great Neck, N.Y. 11023

[21] Appl. No.: 83,023

[22] Filed: Aug. 10, 1987

[51] Int. Cl.⁴ .......................................... H01M 2/04
[52] U.S. Cl. ..................................... 429/177; 429/56; 429/65; 429/72
[58] Field of Search ................ 429/65, 163, 175, 122, 429/72, 177

[56] References Cited

U.S. PATENT DOCUMENTS

| | | | |
|---|---|---|---|
| 2,159,890 | 5/1939 | Ferguson | 429/163 |
| 2,713,603 | 7/1955 | Weber | 429/163 |
| 4,444,853 | 4/1984 | Halsall et al. | 429/177 |
| 4,699,855 | 10/1987 | Abraham et al. | 429/175 |

*Primary Examiner*—Donald L. Walton
*Attorney, Agent, or Firm*—Alan H. Levine

[57] ABSTRACT

A storage battery provided with a cover located over the top wall of the battery casing, the cover being vented so that any gases within the space between the cover and top wall can flow to the atmosphere. An end shield is located alongside each end wall of the battery casing, each end shield being spaced from its respective casing end wall. The cover and end shields may be integrally formed as a single piece of molded plastic, or the end shields may form part of a continuous band surrounding the side and end walls of the casing. Side panels may depend from the sides of the cover and extend alongside the side walls of the battery casing. Each side panel has portions extending beyond the end edges of its respective casing side wall the end shields being supported by the extending portions of the side panels. Legs may extend underneath the battery casing from the lower edges of the side panels so as to secure the cover and end shields to the battery casing.

15 Claims, 2 Drawing Sheets

STORAGE BATTERY HAVING A PROTECTIVE SHIELD

This invention relates to storage batteries, and more particularly to protection in the event such a battery explodes.

Storage batteries, such as those used in most automobiles, comprise a number of electrolytic cells. The cells include metal electrodes and an electrolytic liquid, typically sulfuric acid. As a battery is used or stored, electrolysis of water occurs, producing hydrogen and oxygen gases which rise to continually occupy the ullage area within the battery casing, i.e., the volume within the casing located above the electrolytic liquid level. To limit the build-up of pressure whithin the casing resulting from the creation of the gases, it is common to provide the top wall of the battery casing with a vent cap located over each cell. The hydrogen and oxygen gases generated within the battery casing are vented to the atmosphere through the vent caps.

A problem presented by storage batteries involves the fact that an ignition source such as a spark or flame in the vicinity of the battery can ignite the hydrogen being vented, and often such emission can propagate back through the vent cap into the interior of the battery casing, resulting in an explosion of the hydrogen-/oxygen mixture within the casing. In addition, sparks can be generated within the battery itself, such as by reason of a loose connection between an electrode and a conductor connected to it, thus setting off an explosion of the gases within the casing.

When an explosion occurs, the flame front expands rapidly away from the source of the explosion. The shock wave produced can have a speed exceeding 9000 feet per second, creating a pressure pulse exceeding 300 psi within a time duration of approximately 1.3 milliseconds. These phenomena can cause a rupture of the battery casing, and someone working near the battery is in danger of being hit by a fragment of the battery casing, and being sprayed with sulfuric acid from within the battery. The portions of the battery casing which usually fragment during an explosion are the casing cover, and those portions of the casing walls and internal partitions located in the vicinity of the ullage area. The casing fragments produced by the explosion seldom weigh more than a few ounces, and they may travel at speeds ranging from 80 to 100 feet per second. Thus, they have the ability to cause serious harm to someone who is hit by such a fragment, particularly if the person is struck in the eye(s).

One way to minimize the danger of a battery explosion to the person working on or near the battery is by using a protective shield of the type illustrated and described in co-pending ppplication Ser. No. 882,289, filed July 7, 1986, now U.S. Pat. No. 4,699,855. Use of a protective shield is based on the realization that completely preventing explosion of storage batteries will not be practically feasible within the foreseeable future. In fact, the above-identified co-pending application refers to numerous patents which represent earlier attempts to eliminate explosions or to minimize their danger.

The protective shield of the above-identified co-pending application is located above the battery casing top wall so as to deflect both acid spay and pieces of the casing top wall which rise vertically from the battery, so as to prevent them from striking a person who is working over the battery. To that extent, the shield does perform successfully. However, that shield does not intercept acid spray and fragments traveling in a generally horizontal direction from the exploding battery. While such spray and fragments are generally less dangerous than those which travel vertically, it would be desirable to deflect horizontally traveling products of an exploding battery.

Therefore, it is an object of the present invention to further minimize the danger of a battery explosion by preventing, or greatly limiting, exploding fragments and acid spray traveling in all directions from an exploding battery.

This objective is achieved, according to the invention, by providing a protective shield including a cover located over the top wall of the battery casing, and an end shield alongside each end wall of the battery casing, each end shield being spaced from its respective casing end wall.

The invention is predicated upon a determination that when a battery explodes, the battery casing can rupture at one of its corners, i.e., at a top edge of the ullage area. The casing fracture propagates downwardly along a corner of the casing where one side wall and one end wall of the casing meet, thereby permitting the top of the end wall to flap outwardly, releasing acid and fragments from inside the battery. By employing end shields close to, but suitably spaced from, each battery casing end wall, outward flapping of the ruptured end wall is limited. The top of the ruptured end wall strikes the end shield and rebounds toward the battery. Since outward flapping of the top of the end wall is thereby limited, propagation of the fracture along the edge of the end wall is reduced, as compared to the length of the fracture which would be created if outward flapping of the end wall were not restrained. Moreover, rebounding of the end wall off the end shield dissipates energy of the explosion which further reduces the tendency of the casing to fracture. At the same time, the end shield intercepts fragments and acid traveling horizontally from the exploding casing, while the cover deflects fragments and acid traveling vertically.

It is another object of the invention, in one of its embodiments, to provide a protective shield in which the cover and end shields are integrally formed as a single piece.

It is an additional object of the invention, according to another embodiment, to provide such a shield in which the end shields form part of a continuous band, which may be rigid or flexible, surrounding the side and end walls of the battery casing.

Other objects and features of the invention will be apparent from the following description, in which reference is made to the accompanying drawings.

Figure 1:
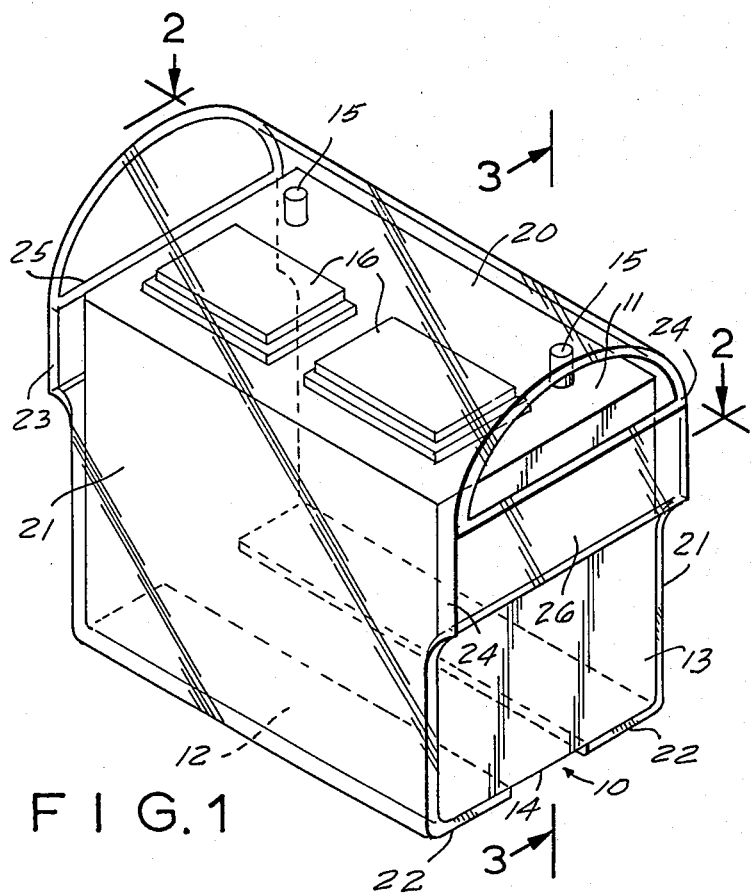
FIG. 1 is a perspective view of one embodiment of a storage battery having a protective shield according to this invention.
Figure 2:
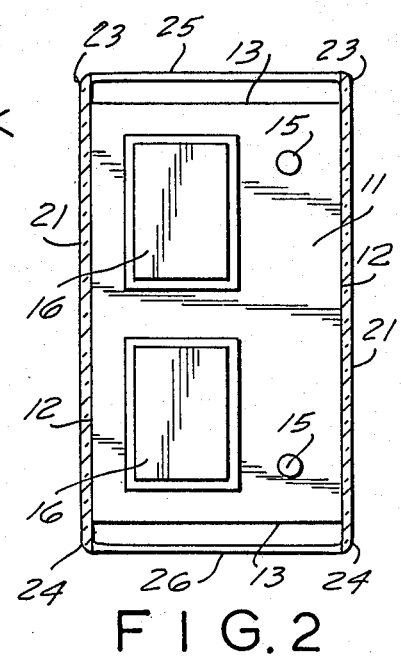
FIG. 2 is a horizontal cross-sectional view taken along line 2—2 of FIG. 1.
Figure 3:
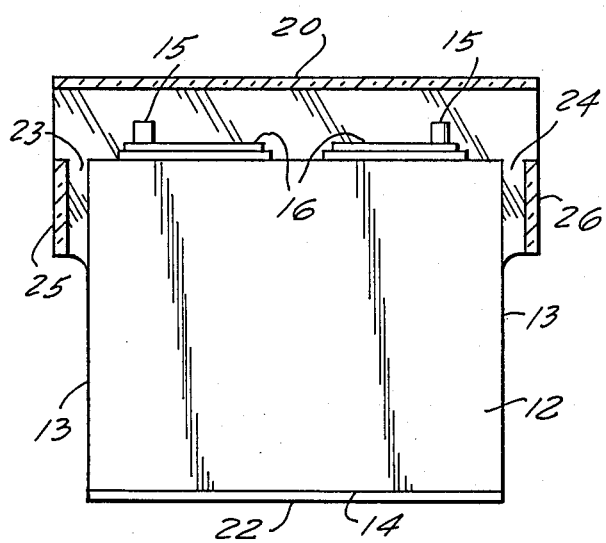
FIG. 3 is a vertical cross-sectional view taken along line 3—3 of FIG. 1.

One embodiment chosen to illustrate the present invention, and shown in FIGS. 1-4, involves a storage battery 10 including an outer casing having a top wall 11, two side walls 12, two end walls 13, and a bottom wall 14. Upstanding on top wall 11 are two battery terminals 15, for connection to battery cable clamps, and two covers 16 which enclose gas venting means for the individual cells of the battery.

The protective shield chosen to illustrate this embodiment of the invention includes an inverted, generally U-shaped, in this case generally semi-elliptical-shaped, cover 20. Other inverted U-shapes could be used, such as an inverted channel shape of V-shape. The length of cover 20 should be such that it will completely cover and extend beyond the end walls 13, by means of extensions 23 and 24.

Depending from the longitudinal sides of cover 20 are side panels 21, each side panel being alongside one of the side walls 12 of the battery casing. At the lower edge of each side panel 21, a leg 22 extends beneath bottom wall 14 of the battery casing. Legs 22 serve to retain the protective shield on the battery.

Each side panel 21 is formed with extensions 23 and 24 projecting beyond the end edges of the casing side wall 12 to which it is adjacent. An end shield 25 extends between extensions 23 of the two side panels, and a similar end shield 26 extends between extensions 24 of the side panels. Extensions 23 and 24 serve to support end shields 25 and 26 in spaced relation to end walls 13 of the battery casing alongside which end shields 25 and 26 are located, and the upper, curved portions of these extensions serve to further shield the battery. Provision of this spacing between each end shield 25, 26 and is respective casing side wall 13 has been found to be of critical importance in dramatically reducing the danger of flying fragments and acid produced by a battery explosion.

Figure 4:
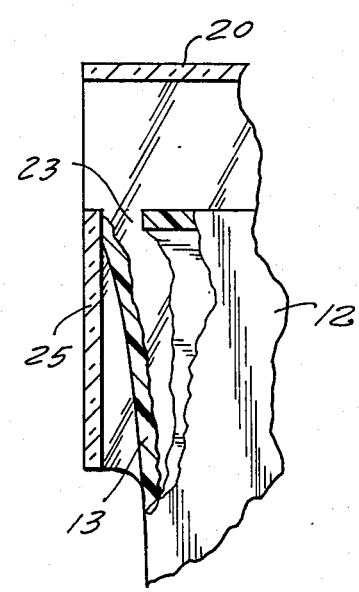
FIG. 4 is a fragmentary view, on an enlarged scale, of a portion of FIG. 3 during a battery explosion.

More specifically, explosion of a battery involves the explosion of gases within the ullage area of the battery casing. When the explosion occurs, the battery casing can rupture first at a corner where top wall 11, a side wall 12, and an end wall 13 meet. From this corner, the battery casing can fracture along an edge where the top wall and end wall meet and also along the edge where the end wall and side wall meet. These fractures permit an upper corner of the end wall 13 to flap outwardly under the explosive pressure within the battery. Ordinarily, this outward flapping of the end wall is unrestrained. However, when end shield 25 or 26 is present, the degree to which end wall 13 can flap outwardly is limited, as indicated in FIG. 4. Once end wall 13 strikes end shield 25, it can flap outwardly no further, and hence propagation of the battery casing fracture is retarded. As a result, the casing ruptures less than if end wall 13 were unrestrained, and hence fewer fragments and a smaller amount of acid are permitted to leave the battery. In addition, and perhaps more important, when outwardly flapping end wall 13 strikes end shield 25 or 26, it rebounds back toward the battery thereby dissipating some of the energy of the explosion which would otherwise produce additional fragment and acid splash.

Surprisingly, spacing end shields 25 and 26 from battery end walls 13 is more beneficial in containing the effects of a battery explosion than arranging the end shields in engagement with their respective end walls. The reason appears to be that when the end shield engages the battery end wall, explosive energy is not sufficiently dissipated by flapping and rebounding of the battery end walls. As a result thereis a relatively greater pressure build-up which, in turn, causes extensive fragmentation and crack propagation throughout the battery structure. However, when the end shield is spaced from the battery end wall, a rebound effect on the outwardly flapping end wall is produced which helps dissipate the energy of the explosion. In order to obtain the beneficial effect described above, end shield 25, 26 should be spaced from end wall 13 at a distance which is dependent on the battery size and configuration. At the same time, the end shield should not be spaced so far from the battery end wall so that excessive flapping and inadequate rebound effect is achieved. For a standard automobile storage battery, it has been found that an effective spacing between the end shield and the battery end wall lies between one quarter inch and three quarters inch.

Desirably, the upper edge of the end shield 25, 26 lies in approximately the same plane which contains casing top wall 11. In this way, it will not interfere with access to battery terminals 15 through the open ends of cover 20. While end shield 25, 26 could extend downwardly as far as desired, it is not necessary for the lower edge to extend far below the ullage area of the battery, since explosions occur only in the ullage area. Furthermore, if the lower edges of end shields 25 and 26 terminate at about the lower level of the ullage area within the battery, the lower regions of side panels 21 can be pried apart to permit the protective shield to be placed over the battery and moved down along the battery until legs 22 snap under battery bottom wall 14.

The protective shield illustrated in FIGS. 1-4 may be formed in any convenient manner, such as from an initially flat sheet cut and bent to the shape shown. Preferably, however, all the parts of the shields 25 and 26, are formed as a single piece of molded plastic. In the present example, the lower portions of side panels 21, and legs 22, serve to retain the protective shield on the battery. However, other types of retention means could be used. For example, each side panel could terminate at the lower edges of extensions 23 and 24, and straps extending beneath the battery could be used to tie together the lower edges of the two side panels.

It is important that the space between top wall 11 of the casing and the cover 20 be vented to the atmosphere, so that hydrogen gas escaping through the venting cap of the battery does not build up to explosive proportions within that space. In the present example, venting is provided by the open ends of cover 20. This is another reason why it would be undesirable for the upper edges of end shields 25 and 26 to rise above the level of top wall 11, since the end shield might then somewhat obstruct free flow of air through the end openings of the cover.

Figure 5:
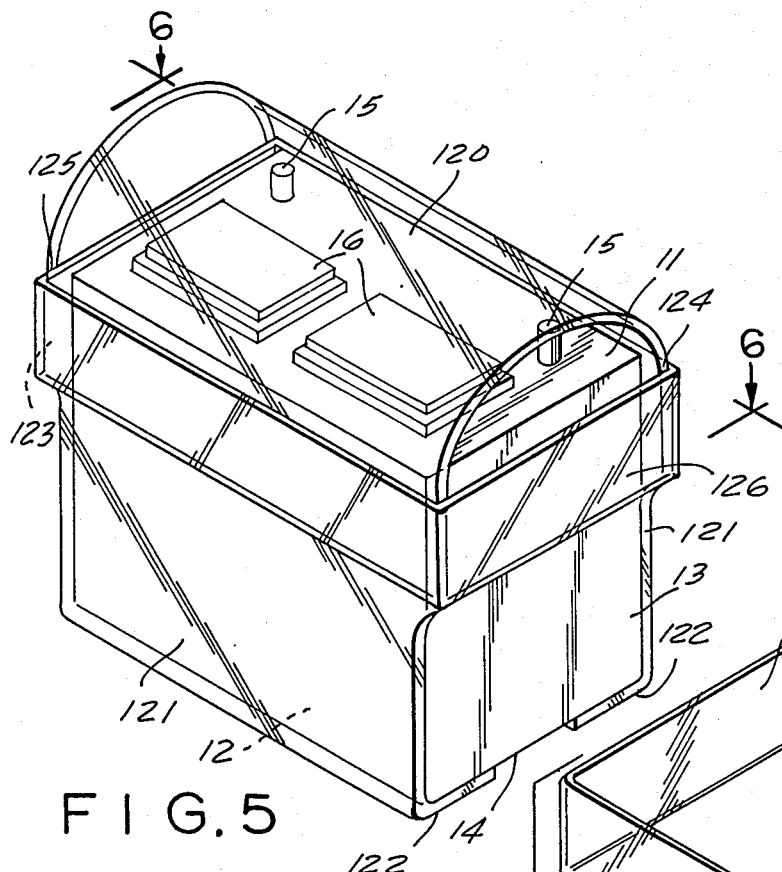
FIG. 5 is a perspective view of another embodiment of a storage battery having a protective shield according to this invention.
Figure 6:
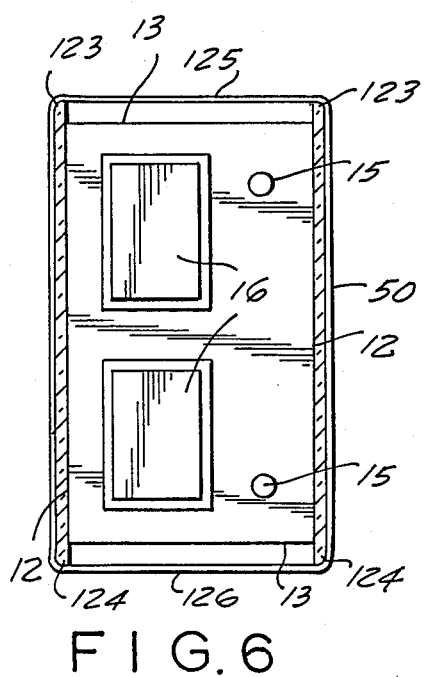
FIG. 6 is a horizontal cross-sectional view taken along line 6—6 of FIG. 5.
Figure 7:
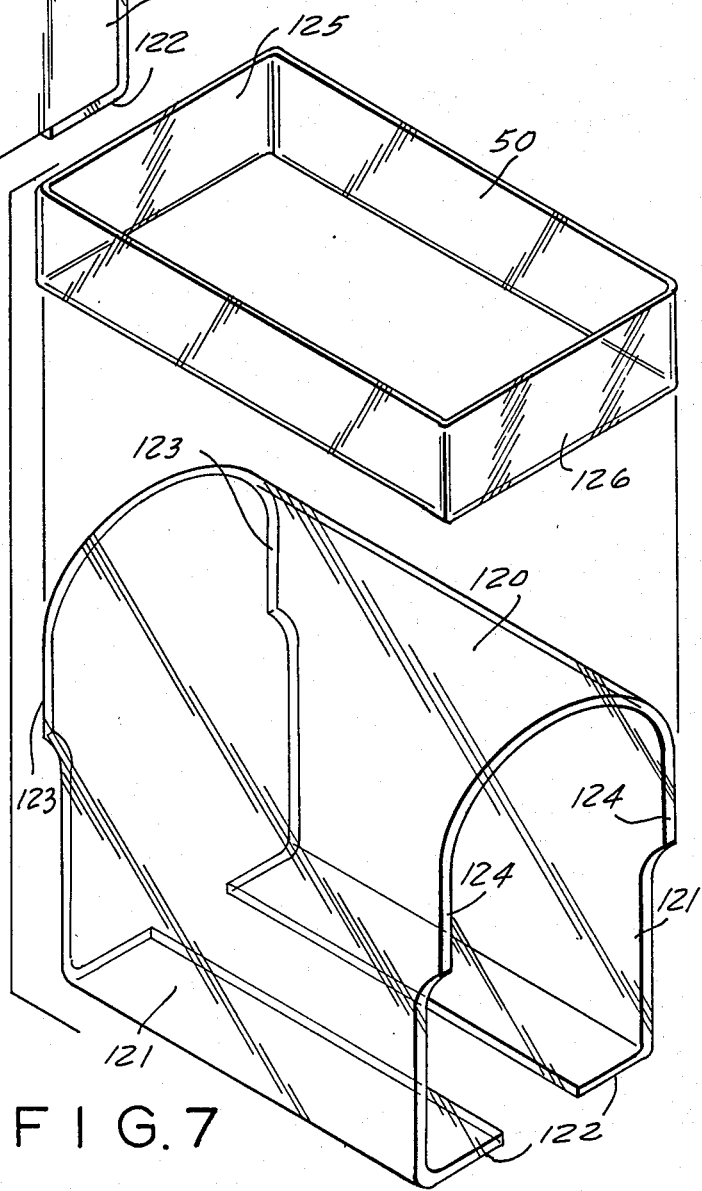
FIG. 7 is an exploded perspective view of the shield cover and band shown assembled in FIG. 5.

In the embodiment of the invention described above, end shields 25 and 26 are formed integrally with the remainder of the protective shield. Alternatively, the end shields could form part of a continuous band which is assembled with the cover and side panels, as illustrated in FIGS. 5-7. In this embodiment, cover 120, side panels 121, and legs 122 may be integrally formed of a single piece of sheet metal or molded plastic. Each side wall 121 is formed with extensions 123 and 124 which project outwardly beyond the side walls 12 of the battery with which the shield is used.

A continuous band 50 is provided, which may be formed of a relatively rigid material, such as sheet metal, or a flexible and resilient material, such as rubber or plastic.

The protective shield may be placed over the battery by spreading side panels 121 away from each other so as to permit legs 122 to move downardly along the side walls 12 of the battery and snap beneath bottom wall 14. Thereafter, band 50 is slipped over the cover 120 and on to extensions 123 and 124, and firmly surrounds side walls 12 and end walls 13 of the battery casing. Of course, the two long sides of band 50 engage the side panels 121. The portions 125 and 126 of band 50, which are supported between extensions 123 and 125, respectively, define end shields 125 and 126 corresponding to the end shields 25 and 26 of the embodiment illustrated in FIGS. 1-4.

A particular advantage of the embodiment shown in FIGS. 5-7 is that it is easy to apply to the battery, since there is very little restraint against spreading side panels 121 so that they can fit around the battery while the protective shield is being applied to the battery. Furthermore, band 50, by snugly engaging around side panels 121 and extension 123, 124, firmly holds legs 122 beneath the battery, so as to reliably secure the protective shield to the battery.

Cover 120 serves the same function as cover 20, namely deflecting vertically moving fragments and acid splash produced when a battery explodes. End shield portions 125 and 126 of band 50 serve the same function as end shields 25 and 26, namely, reducing the severity of an explosion by causing the outwardly flapping battery casing end wall 13 to rebound toward the battery, thereby reducing fracture of the casing, reducing flying fragments and acid, and dissipating some of the energy of the explosion. The end shields also tend to deflect any horizontally moving fragments and acid produced by the explosion.

The invention has been shown and described in preferred form only, and by way of example, and many variations may be made in the invention which will still be comprised within its spirit. For example, in the embodiments illustrated, and described above, the protective shield is a device formed independently of the battery and assembled therewith. However, the cover 20 and end shields 25 and 26 could be made integral with top wall 11 and/or other parts of the battery casing. It is understood, therefore, that the invention is not limited to any specific form or embodiment except insofar as such limitations are included in the appended claims.

We claim:
1. A storage battery comprising:
    an outer casing including a top wall, two side walls, and two end walls,
    a cover located over the top wall, the cover being vented so that any gases within the spaced between the cover and top wall can flow to the atmosphere, and
    an end shield alongside each end wall of the battery casing, each end shield being spaced from, and out of contact with, its respective casing end wall, so that in the event of a battery explosion the casing end wall is free to flap outwardly toward the end shield.

2. A storage battery as defined in claim 1 wherein each end shield is spaced from its respective casing end wall a distance between ¼ and ¾ inch.

3. A storage battery as defined in claim 1 wherein the upper edges of the end shields lie in a plane which is approximately coplanar with the plane of the casing top wall.

4. A storage battery as defined in claim 1 wherein the cover and end shields are integrally formed as a single piece of molded plastic.

5. A storage battery as defined in claim 1 wherein the end shields form part of a continuous band surrounding the side and end walls of the casing.

6. A storage battery as defined in claim 5 wherein the band is formed of a rigid material.

7. A storage battery as defined in claim 5 wherein the band is formed of a flexible material.

8. A storage battery as defined in claim 1 including retaining means for securing the cover and end shields to the battery casing.

9. A storage battery comprising:
    an outer casing including a top wall, two side walls, and two end walls,
    a cover located over the top wall, the length and width of the cover being about equal to the length and width of the battery casing, both ends of the cover being open to provide for the venting so that any gases within the space between the cover and top wall can flow to the atmosphere, and
    an end shield alongside each end wall of the battery casing, each end shield being spaced from its respective casing end wall, and the upper edges of the end shields lying in a plane which is approximately coplanar with the plane of the casing top wall.

10. A storage battery comprising:
    an outer casing including a top wall, two side walls, and two end walls,
    a cover located over the top wall, the cover being vented so that any gases within the space between the cover and top wall can flow to the atmosphere,
    an end shield alongside each end wall of the battery casing, each end shield being spaced from its respective casing end wall, and
    side panels depending from the sides of the cover, each side panel being alongside one side wall of the battery casing, and each side panel having portions extending beyond the end edges of its respective casing side wall, each end shield being supported by the portions of the side panels extending beyond the same casing end wall.

11. A storage battery as defined in claim 10 wherein the end shields form part of a continuous band surrounding the side panels and the extending portions thereof.

12. A storage battery comprising:
    an outer casing including a top wall, two side walls, and two end walls,
    a cover located over the top wall, the cover being vented so that any gases within the space between the cover and top wall can flow to the atmosphere,
    an end shield alongside each end wall of the battery casing, each end shield being spaced from its respective casing end wall,
    side panels depending from the sides of the cover, each side panel being alongside one side wall of the battery casing, and retaining means for securing the cover and end shields to the battery casing, the retaining means including legs extending underneath the battery casing from the lower edges of the side panels.

13. A storage battery as defined in claim 12 wherein the end shields form part of a continuous band surrounding the side panels and end walls of the casing, the band serving to hold the side panels against their respective casing side walls, thereby also serving to maintian the legs beneath the battery casing.

14. A storage battery as defined in claim 12 wherein the cover, end shields, side panels, and legs are integrally formed as a single piece of molded plastic.

15. A storage battery as defined in claim 14 wherein the side panels are flexible to permit spreading them so that the cover can be placed over the battery casing and the legs can be passed down along the casing sides until they snap under the casing.

* * * * *